United States Patent
Rumbarger

[11] 3,762,782
[45] Oct. 2, 1973

[54] BEARING ARRANGEMENT FOR ROLLING CUTTER
[75] Inventor: John H. Rumbarger, Wayne, Pa.
[73] Assignee: Subterranean Tools Inc., Beaumont, Tex.
[22] Filed: May 17, 1971
[21] Appl. No.: 144,122

[52] U.S. Cl. .................................. 308/8.2, 175/372
[51] Int. Cl. .... F16c 19/49, F16c 27/04, F16c 33/58
[58] Field of Search .................... 308/8.2, 196, 216, 308/235; 175/372

[56] References Cited
UNITED STATES PATENTS
| 1,437,834 | 12/1922 | Buckwalter | 308/215 |
| 2,120,154 | 6/1938 | Schildgen | 308/235 |
| 2,759,243 | 8/1956 | Smith | 308/196 X |
| 3,447,394 | 6/1969 | Wagner et al. | 308/196 X |

FOREIGN PATENTS OR APPLICATIONS
946,559  6/1949  France ............................. 308/215

Primary Examiner—Charles J. Myhre
Assistant Examiner—Barry Grossman
Attorney—Melvin A. Crosby

[57] ABSTRACT

The specification discloses an excavating tool in the form of a rolling cutter in which a tubular outer body is mounted on an inner journal or core member and bearings are provided between the core member and the body in the form of axially spaced roller bearings and a row of balls between the roller bearings. The races for the balls are not circular in cross section, but are formed to a lesser curvature than the balls and engage the balls on opposite sides of the central radial plane of the row of balls.

3 Claims, 3 Drawing Figures

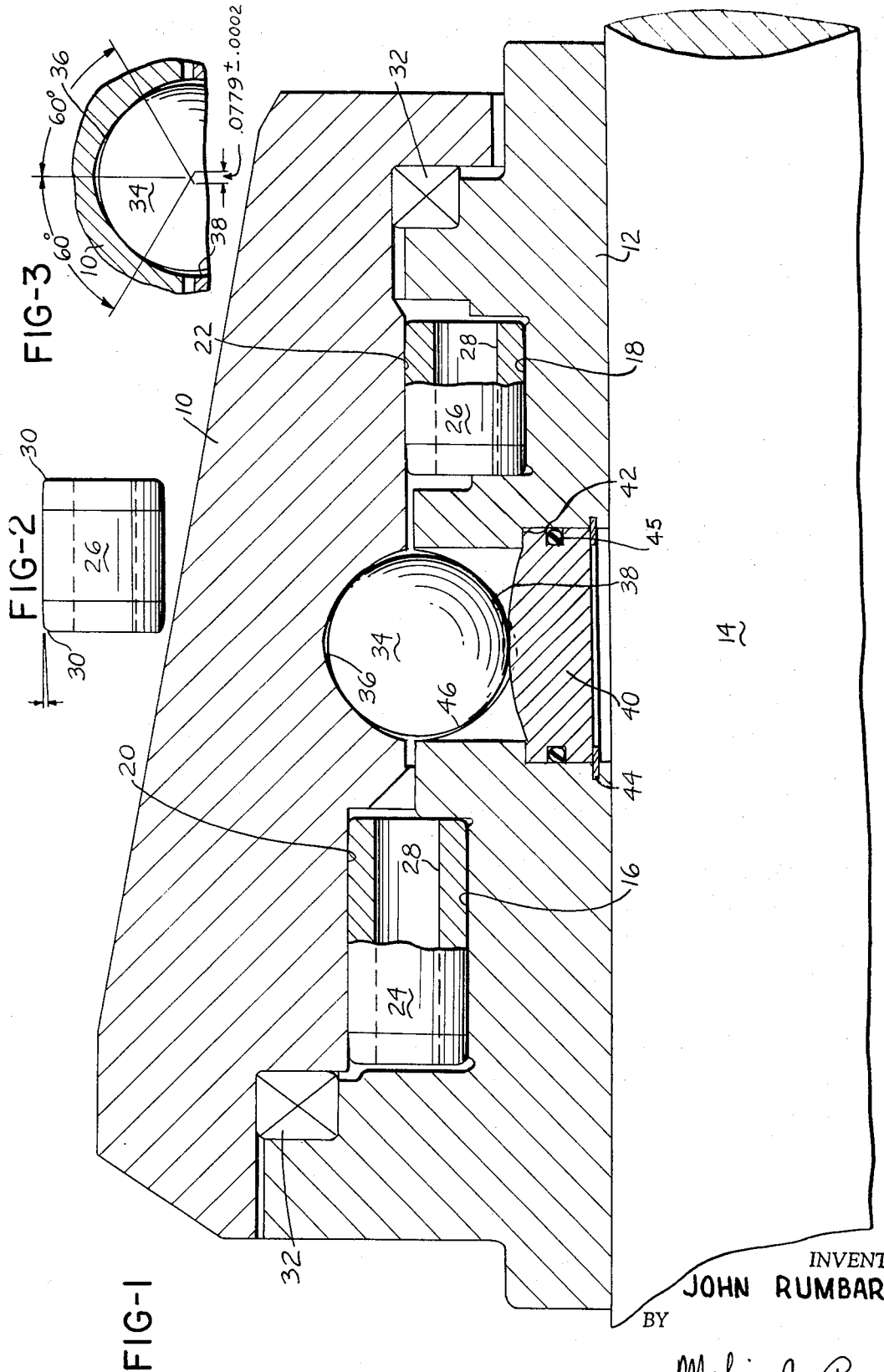

BEARING ARRANGEMENT FOR ROLLING CUTTER

This invention relates to excavating tools and is particularly concerned with a rolling cutter of the type employed for boring operations, such as in raise boring or in tunnel boring.

Rolling cutters of the nature referred to are well known and comprise a central journal or core member on which is rotatably mounted a body member that is provided with ribs or protuberances or hard inserts so that when the body is pressed against formation and rolled thereover, the formation will be reduced by breaking and crushing.

The service to which such roller cutters are subjected is severe with extremely high pressure peaks and shock loads being imposed thereon. The bearings which journal the body on the journal or core member or thus operating under such conditions that they can deteriorate quite rapidly, and the life of the bearings in such a roller cutter has always represented a problem.

With the foregoing in mind, the primary object of the present invention is the provision of a bearing arrangement for supporting a roller cutter body on the journal therefor which will have increased life over what has been obtainable heretofore.

Another object is the provision of a bearing arrangement for supporting a rolling cutter body on a core or journal member in which relative axial movement between the body and journal member is limited.

Still another object is the provision of a bearing arrangement of the nature referred to which can be preloaded and which has shock absorbing characteristics.

These and other objects and advantages of the present invention will become more apparent upon reference to the following detailed specification taken in connection with the accompanying drawings in which:

FIG. 1 is a fragmentary longitudinal section through a cutter embodying the features of the present invention;

FIG. 2 is a view showing a typical roller used in the cutter; and

FIG. 3 is a schematic view showing the manner in which the novel bearing race configuration for the bearing balls of the cutter are formed.

BRIEF SUMMARY OF THE INVENTION

The rolling cutter of the present invention has a central journal or core member adapted for being mounted on a supporting shaft and a body member surrounding the core member. Axially spaced tubular rollers are interposed between the core member and the body member in a central row of balls located axially between the rollers is also provided.

The races which the balls engaged are formed somewhat in the manner of a Gothic arch so that each ball engages the races at points angularly displaced on opposite sides of the central radial plane of the row of balls thereby imparting axial stability to the support which the bearing arrangement provides for the rotatable body.

DETAILED DESCRIPTION OF THE INVENTION

Referring to the drawings somewhat more in detail, the excavating tool, or cutter, comprises an outer rotatable body part 10 which may be tapered, as shown, but which may have a cylindrical or ribbed outer configuration, if so desired. The body part 10 is provided with a bore extending axially therethrough and received in the bore is a journal, or core, member 12 which is also hollow and which is mounted on a central support shaft 14. The bore in the body part and the container of the core member increase in diameter from one end to the other for assembly purposes.

Journal member 12 and support shaft 14 are nonrotatably supported in a suitable bracket which is not illustrated herein but which comprises a pair of support legs at the ends of the cutter assembly or a "U" shaped bracket having upstanding legs between which the cutter assembly is mounted.

The bracket for the cutter is provided to enable the cutter to be mounted on a suitable support which will support the cutter assembly while urging it against a formation to be reduced while also rotating so that the body part 10 of the cutter assembly rolls on the formation in a conventional manner.

The journal member 14 is provided with a pair of radially outwardly facing roller paths 16 and 18 and directly opposed thereto on the inside of cutter body 10 are corresponding roller paths 20 and 22. The journal member and body of the cutters are carburized in at least the regions of the aforementioned paths and ground smooth so that the races will be suitable for receiving therebetween rollers making up the roller bearings of the cutter assembly. The roller races, or paths, in the journal, or core, member are preferably recessed and are slightly longer than the respective rollers.

Between paths 16 and 20, there is disposed a series of rollers 24 and between paths 18 and 22, there is disposed a series of rollers 26. The rollers are confined with slight axial freedom of movement, up to about 0.010 inches in the journal member 12 so as to be freely rollable thereon.

Each roller is about one inch in diameter and has a one-half inch bore extending axially therethrough as indicated at 28. The provision of the bore extending through each roller imparts a slight degree of resilience thereto which assists in preventing undue wear on the rollers or the roller races as the cutter body is rolled on a formation.

Advantageously, as will be seen in FIG. 2, each roller has the ends rounded, as indicated at 30, and about the first one-fourth inch of each roller at each end tapers inwardly toward the adjacent end of the roller at an angle of about one-half degree.

The rollers may be of the same length but, advantageously, the rollers 26 are about 1¼ inches long and the rollers 24 are about 2 inches long. The rollers 26 are disposed on about a 6 inch pitch diameter and constitute a series of 19 rollers, whereas rollers 24 are arranged on a pitch diameter of nearly 7 inches and constitute a set of 22 rollers.

Axially outwardly from the outer ends of the roller sets are seal elements 32 which prevent foreign matter, such as fine grit, from getting into the bearing space inside body 10 while retaining lubricant therein for lubricating the bearings which support body 10 on journal member 12.

About in the center of the length of body 10 and disposed between body 10 and journal member 12 is a set of balls 34 which may be 1¼ inches in diameter and arranged on about a 6¾ inch pitch diameter with 14 balls making up the set.

The balls 34 engage a race 36 provided in body 10 at the radially outer sides of the balls and engage a race 38 provided on journal member 12 on the radially inner sides of the balls.

The balls are charged into the space between races 36 and 38 by availing of a loading plug 40 inserted in hole 42 provided in journal member 12. The plug is put in hole 42 from the inside of the journal member after the balls have been charged into the space between races 36 and 38. Loading plug 40 is supported against axial movement in the bore by engagement with radially inwardly facing shoulder 46 spaced radially outwardly from shaft 14 and by snap ring 44. Seals 45 on plug 40 seal against lubricant leakage.

In use, plug 40 is disposed on the unloaded side of the cutter by keying sleeve 12 to shaft 14 and locating shaft 14 in the support bracket.

A particular feature of the present invention is to be found in the configuration of races 36 and 38. These races are formed, as shown in FIG. 3, so that each of the said races is somewhat in the form of a Gothic arch and consists of two intersecting arcs. In forming the races, the outer one of which is schematically illustrated in FIG. 3, each race is ground in two parts, one on each side of the transverse plane passing through the center of the race, and each part of the race is ground to a larger radius than the radius of balls 34.

As will be seen in FIG. 3, for a race for receiving 1½ inch balls, the radius to which the portions of the race are ground will be about 0.795 plus or minum 0.0005. The centers from which the two portions of the respective race are ground are offset from the point where the centers of the balls rolling thereon will be disposed on opposite sides of the center line, a distance equal to about 0.0779 plus or minus 0.0002 of an inch.

In finding the centers about which each portion of the race is ground, reference lines disposed about 60 degrees on opposite sides of center line are provided and these are extended beyond the ball center until the aforementioned spacing is arrived at. The points of engagement of each ball with the ball races will thus be located about 60 degrees away from the radial central plane of the row of balls.

In grinding the inner race, namely, the race 38 formed in the journal member 12, the same procedure is followed.

The cutter assembly according to the present invention thus has three rows of rolling elements, all of which are free of cages or separators.

Each journal of the series of balls 34 has four contact points for carrying thrust and this makes for greater stiffness against axial movement of the cutter body 10 on the journal member 12 than is obtained with conventional type ball races. Under axial loading of the cutters, only one side of the series of balls will be loaded at a time and, upon reversal of the thrust load, the opposite side of the row of balls is loaded. This results in substantially decreased axial movement under a reversing thrust loading which might be encountered in use.

In conventional bearings, where balls run in deep grooves, reversing axial loading of the cutter body might result in axial movement of the cutter body on the journal member on the order of about 0.015 to about 0.025 inches. The arrangement of the present invention, under similar reversing loading, might result in an axial displacement of the cutter body of only about 0.007 inches total axial movement.

The reduction in axial movement of the cutter body on the journal member simplifies seal design and assists in eliminating leakage and misalignment problems that can result in rapid wear of seals and even failure thereof.

The hollow cylindrical rollers also provide an increased performance life because the rollers can be assembled between their respective races with much closer clearance control. In fact, since the rollers are at least slightly resilient, light diametral preloading of the rollers can be accomplished and this permits the rows of rollers to carry a larger proportion of the external load than has heretofore been possible and, in this manner, the radial load component on the central row of balls can be reduced and the life thereof significantly increased.

The use of hollow rollers also significantly reduces the overall spring rate of the roller bearing row, up to an amount of about 50 per cent.

Still further, the hollow rollers tend to act as shock absorbers and shock loading of rolling cutters is the rule rather than the exception when such cutters are in use. The relatively resilient rollers deflect somewhat when loaded, and the average dynamic or shock loading transmitted to the supporting structure is, thus, appreciably reduced when resilient hollow rollers are employed.

Modifications may be made within the scope of the appended claims.

What is claimed is:

1. In an excavating tool of the roller type; a tubular core or journal member adapted for mounting on a support shaft, a tubular body surrounding said core member in closely spaced relation thereto, axially spaced roller paths formed on the outer periphery of said core member and on the inner periphery of said body and radially resilient tubular rollers disposed in radially prestressed condition in the radial space between said paths to journal said body on said core member, a row of solid balls between said core member and said body located axially about midway between said roller paths, annular ball paths formed on said core member and said body to engage said balls, said ball paths when viewed in cross section being formed of intersecting arcs having less curvature than that of said balls, each of said arcs extending over a range of about 90 degrees on one side of the radial plane of said row of balls, and each of said arcs having the center of curvature so located that the points of contact of each ball with the arcs is removed an angular distance of about 60 degrees about the ball from the radial plane of the row of balls.

2. An excavating tool of the roller type according to claim 1 in which each said roller on the outside has a cylindrical central region and tapers inwardly at each end.

3. An excavating tool of the roller type according to claim 1 in which the roller paths formed on said core member are in the form of radially outwardly opening annular recesses with radial end walls, said end walls being axially spaced a distance greater than the axial length of the respective rollers.

* * * * *